(12) United States Patent
Wang et al.

(10) Patent No.: US 8,061,699 B2
(45) Date of Patent: Nov. 22, 2011

(54) CLAMPING SYSTEM

(75) Inventors: Yan Wang, Nottingham (GB); Nabil Gindy, Leicester (GB); Kevin Walker, Nottingham (GB); Jamie Charles McGourlay, Sheffield (GB); Michael James Berry, Derbyshire (GB)

(73) Assignee: Rolls-Royce PLC (GB)

( * ) Notice: Subject to any disclaimer, the term of this patent is extended or adjusted under 35 U.S.C. 154(b) by 296 days.

(21) Appl. No.: 12/423,112

(22) Filed: Apr. 14, 2009

(65) Prior Publication Data

US 2009/0278294 A1 Nov. 12, 2009

(30) Foreign Application Priority Data

May 9, 2008 (GB) .................................. 0808354.5

(51) Int. Cl.
*B23Q 3/00* (2006.01)
(52) U.S. Cl. ............... 269/9; 269/43; 269/56; 269/287
(58) Field of Classification Search ............... 269/9, 43, 269/56, 58, 85, 159, 900, 309, 310, 237–239, 269/287; 29/281.1, 889.1
See application file for complete search history.

(56) References Cited

U.S. PATENT DOCUMENTS

| | | | | |
|---|---|---|---|---|
| 2,565,925 A * | 8/1951 | Adrian et al. | ................. | 409/131 |
| 3,155,384 A * | 11/1964 | Francis | ................. | 269/101 |
| 3,818,646 A * | 6/1974 | Peterson | ................. | 451/365 |
| 4,125,251 A | 11/1978 | Jamieson, Jr. | | |
| 4,327,495 A * | 5/1982 | Plante | ................. | 29/889.22 |
| 4,447,992 A * | 5/1984 | Bergquist | ................. | 451/326 |
| 4,524,960 A * | 6/1985 | LePoire | ................. | 269/45 |
| 4,638,602 A * | 1/1987 | Cavalieri | ................. | 451/365 |
| 4,710,608 A | 12/1987 | Noda et al. | | |
| 4,805,351 A * | 2/1989 | Dobson et al. | ................. | 451/28 |
| 5,149,071 A * | 9/1992 | Oliveira | ................. | 269/43 |
| 6,158,104 A * | 12/2000 | Roberts et al. | ................. | 29/446 |
| 7,334,306 B2 * | 2/2008 | Beverley et al. | ................. | 29/281.1 |

FOREIGN PATENT DOCUMENTS

| | | |
|---|---|---|
| DE | 3437604 A1 | 10/1984 |
| DE | 8600856 U | 1/1986 |
| EP | 0338460 A1 | 4/1988 |
| GB | 0737693 A | 9/1955 |
| GB | 1217741 A | 12/1970 |

* cited by examiner

*Primary Examiner* — George Nguyen
(74) *Attorney, Agent, or Firm* — McCormick, Paulding & Huber LLP

(57) ABSTRACT

A clamping system for clamping aerofoils. The clamping system has pivotally mounted engagement members that engage the aerofoil mounted on a pivotally mounted arm either side of the pivotal mounting. The arm can pivot as required relative to the item, to accommodate differences in shape in the item, while providing a substantially equal clamping force by both engagement members.

12 Claims, 4 Drawing Sheets

CLAMPING SYSTEM

CROSS REFERENCE TO RELATED APPLICATION

This application is entitled to the benefit of British Patent Application No. GB 0808354.5, filed on May 9, 2008.

FIELD OF THE INVENTION

This invention concerns a clamping system, and particularly, but not exclusively, a clamping system for use in clamping nozzle guide vanes of a gas turbine engine during the carrying out of manufacturing operations on the nozzle guide vanes.

BACKGROUND OF THE INVENTION

Nozzle guide vanes are used for instance in gas turbine engines to guide air therethrough. Nozzle guide vanes generally comprise a pair of aerofoils extending between two spaced plates. The aerofoils have to be orientated in a particular way relative to the other aerofoil in the pair, and also relative to adjacent vanes. During manufacture of nozzle guide vanes, some manufacturing differences invariably occur, such that machining operations such as grinding have to be carried out on the vanes subsequent to casting.

Nozzle guide vanes have to be held securely during such machining operations to enable the operations to be carried out, and also to provide a reaction to any machining forces applied thereto. Because each guide vane is slightly different, it is necessary for each component to be held slightly differently.

Previously difficulties have been encountered in holding nozzle guide vanes during machining operations, and in many instances it has been necessary to remount the nozzle guide vanes between different operations. For instance, up to eight separate set ups have been used at times to hold a nozzle guide vane during grinding operations.

SUMMARY OF THE INVENTION

According to the present invention there is provided a clamping system, the system including a support platform upon which an item to be clamped can locate, a clamping assembly selectively movable to a closed position relative to the support platform, with one or more clamping arrangements being provided on the clamping member, the or each clamping arrangement including a pair of engagement members mounted on a pivotally mounted arm either side of the pivotal mounting, such that the engagement members are engageable when the assembly is in a closed position with an item on the support platform to be clamped, and the arm can pivot as required relative to the item, to accommodate differences in shape in the item, whilst providing a substantially equal clamping force by both engagement members, wherein a pair of clamping arrangements are provided, each pivotally mounted to a beam member, the beam member being pivotally mounted on the clamping assembly between the clamping arrangements.

The beam member may be threadably mounted by a bolt member on the clamping arrangement, such that a predetermined clamping force can be applied thereto. The bolt member may be engageable with the beam member through profiled contact surfaces which permit pivotal movement of the beam member. The contact surfaces may be substantially hemispherical.

Two beam members may be provided on the clamping arrangement, and the beam members may be arranged adjacent to each other in a parallel alignment.

The engagement members may include heads with an enlarged cross sectional area relative to the remainder of the engagement member, so as to spread the clamping load on an item.

The engagement members may have heads which include trapped movable members, which movable members may have one or more generally flat surfaces engageable with a clamped item.

The clamping assembly may be pivotally mounted relative to the support platform, and locking means may be provided for retaining the clamping assembly in a closed position.

One or more adjustable supports may be provided engageable with the item, and the adjustable supports may be provided on the clamping assembly and/or the support platform.

The or each adjustable support may include a projection member extending from a housing, and means for locking the projection member in a required position relative to the housing. The projection member may be spring urged from the housing.

One or more non adjustable engagement members may be provided on the clamping assembly and/or support platform.

One or more clamping engagement members may be provided, which clamping engagement members may be threadably mounted on the clamping assembly and/or support platform.

The invention also provides a clamping system for a nozzle guide vane of a gas turbine engine, the system being according to any of the preceding ten paragraphs.

The system may be arranged such that the engagement members are engageable with the aerofoil of a nozzle guide vane.

The system may be arranged such that the clamping arrangement on one side of a beam member engage with a first aerofoil of a nozzle guide vane, and the clamping arrangement on the other side of the beam member engage with a second aerofoil of the nozzle guide vane.

DETAILED DESCRIPTION OF THE PREFERRED EMBODIMENTS

Figure 1:
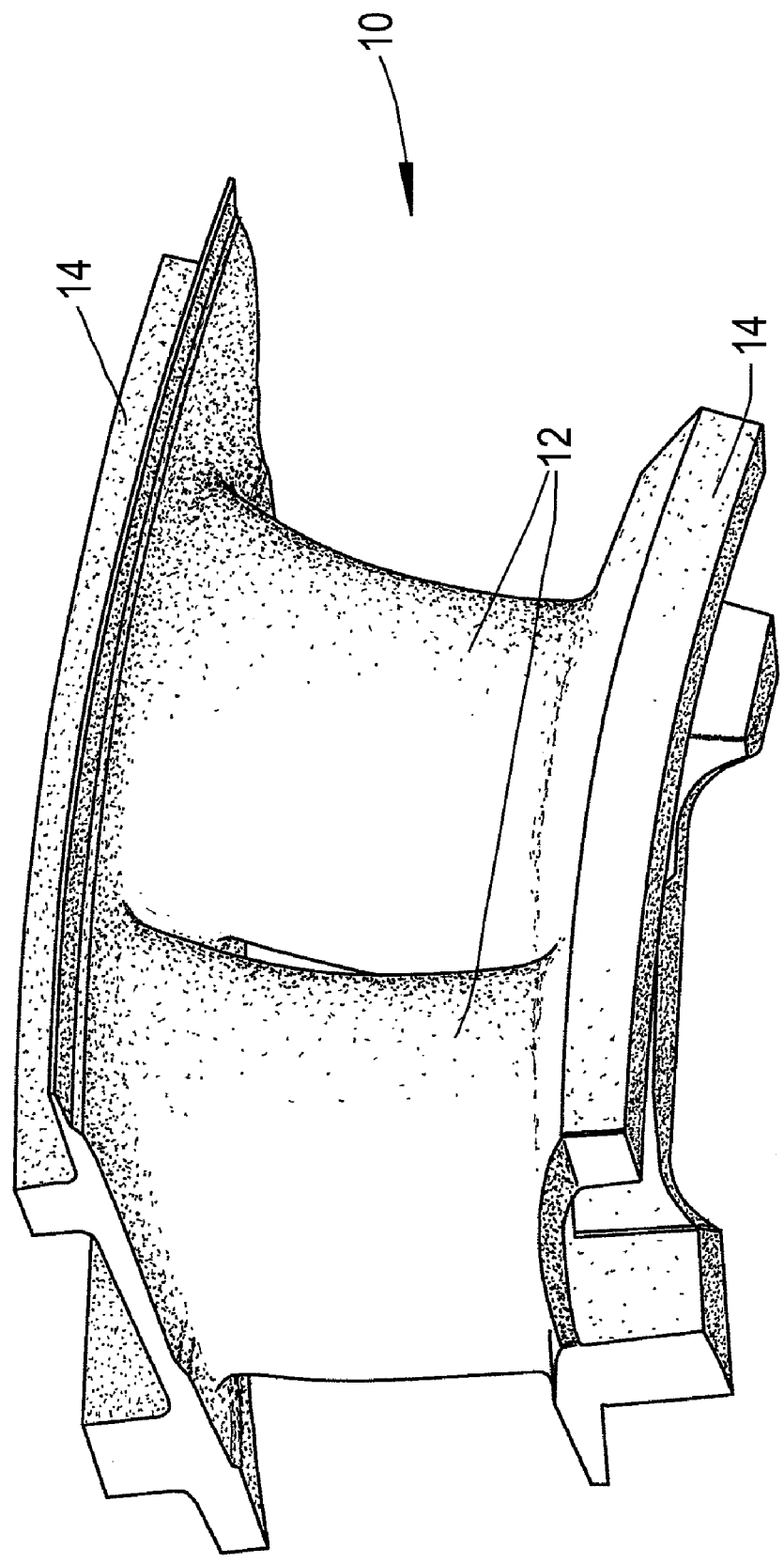
FIG. 1 is a diagrammatic perspective view of a nozzle guide vane.

FIG. 1 shows a nozzle guide vane 10 as used for example in a gas turbine engine of a jet aircraft. The guide vane 10 comprises two spaced aerofoils 12 extending between plates 14.

Figure 2:
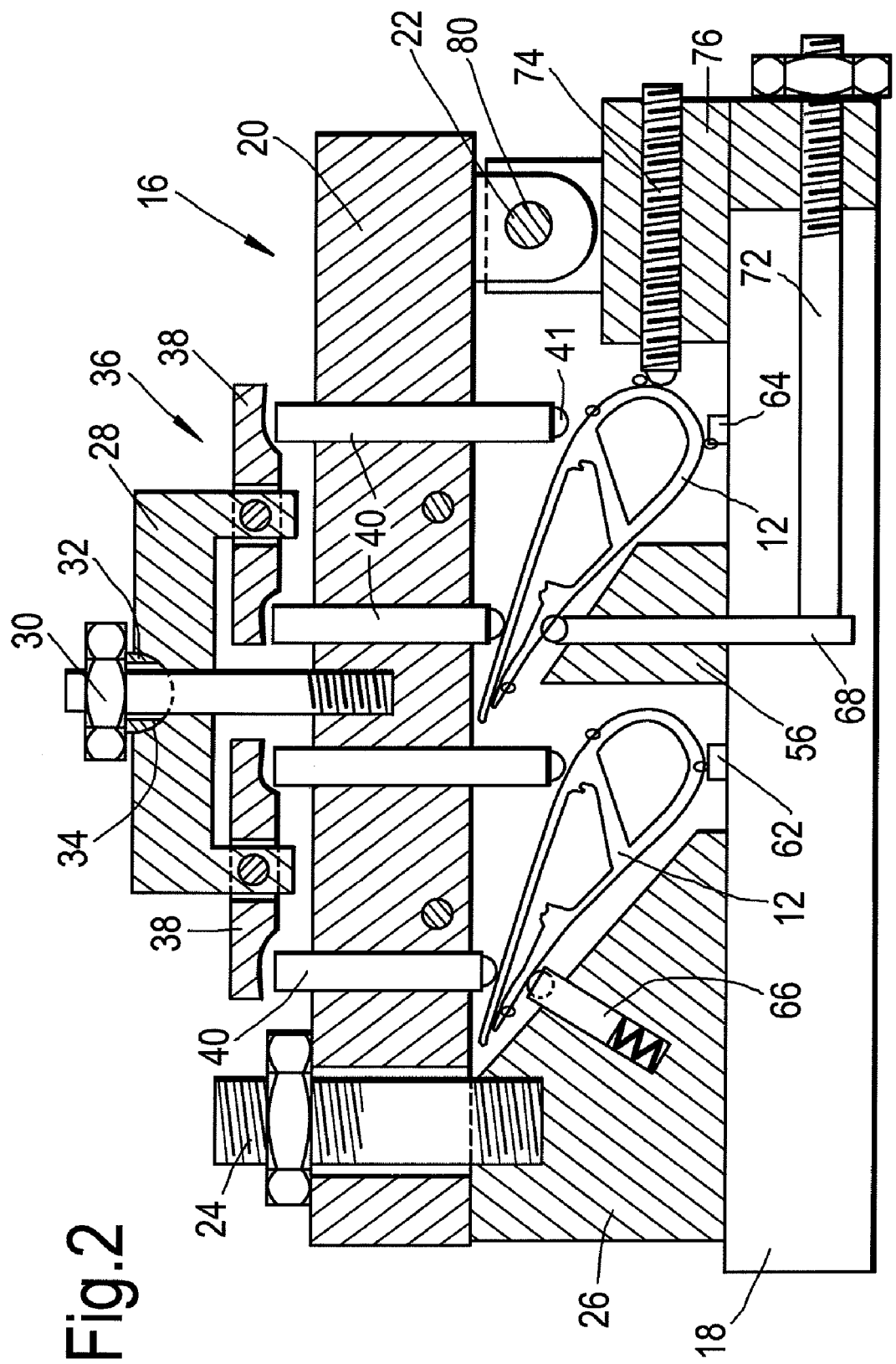
FIG. 2 is a diagrammatic sectional side view through a clamping system according to the invention.
Figure 3:
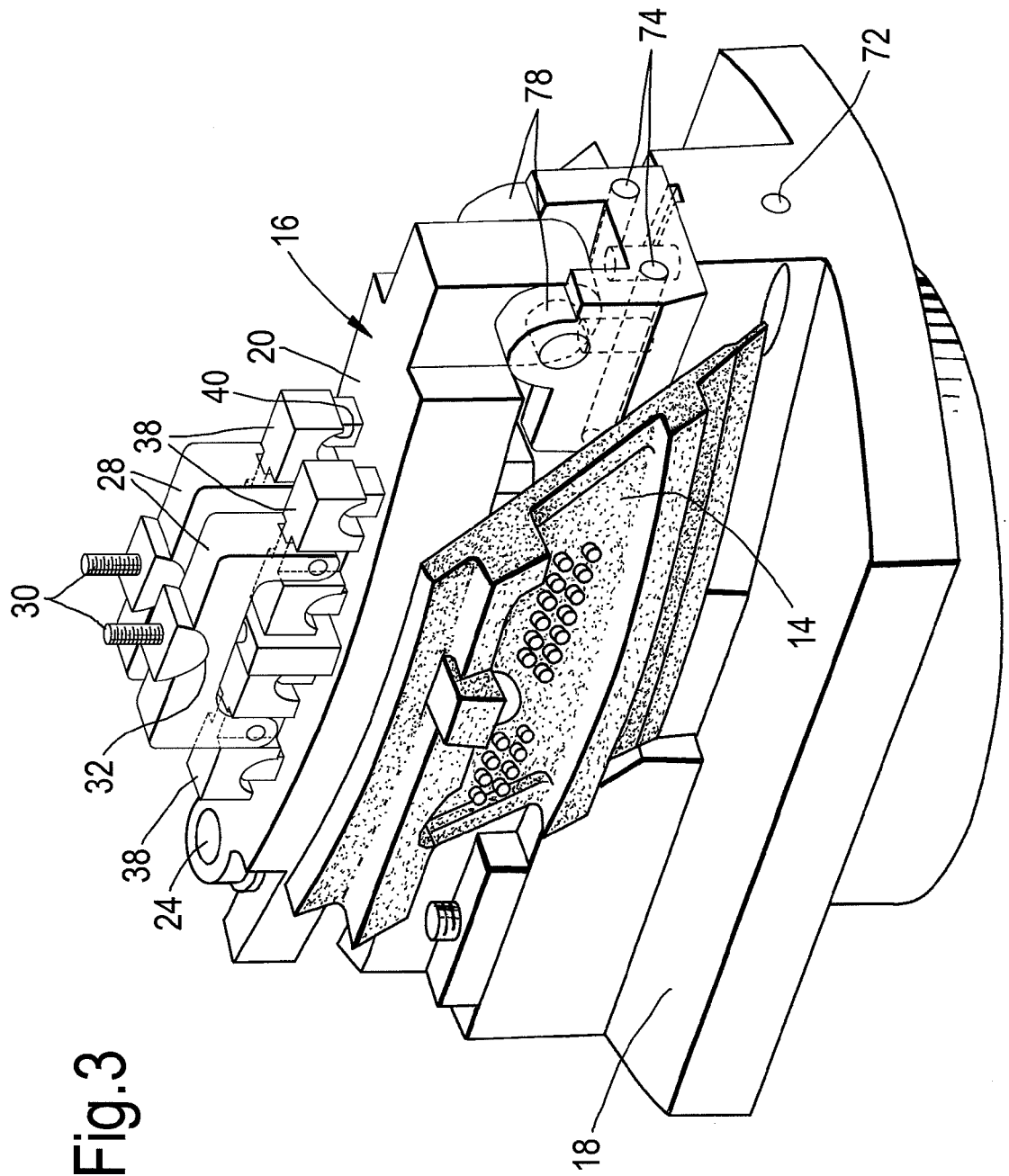
FIG. 3 is a diagrammatic perspective view of the system of FIG. 2.
Figure 4:
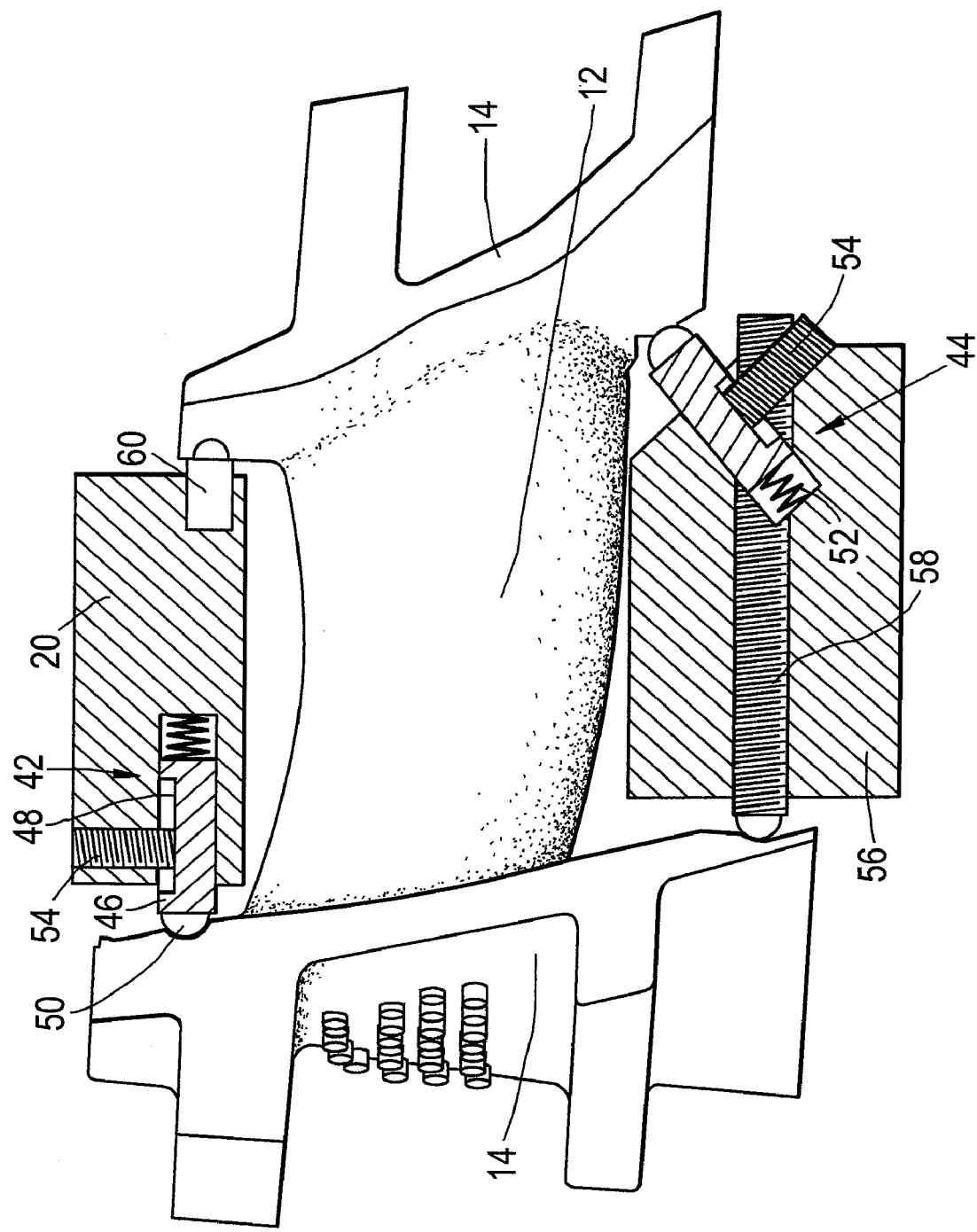
FIG. 4 is a diagrammatic sectional end view through the system of FIG. 2.

FIGS. 2-4 of the drawings show a clamping system 16 in use clamping a guide vane 10. The system 16 includes a support platform 18 and a clamping assembly 20. The assembly 20 is pivotally mounted to the support platform 18 towards the right hand side of the latter as shown in FIG. 2, about a horizontal axis 22. A bolt 24 is extendable through the left hand end of the support platform 18 as shown in FIG. 2 and threadably engageable in a block 26 on the left hand end of the support platform 18, for selectively retaining the clamping assembly 20 in a closed position as shown.

The system 16 is shown clamping the nozzle guide vane 10 with the plates 14 extending behind and in front of the system 16 as shown in FIG. 2. The system 16 is engageable with the two aerofoils 12.

Two shallow n shaped beams 28 are mounted in a parallel alignment on top of the assembly 20. Each beam 28 is mounted by a bolt 30 which engages with a hemispherical section block 32, and through which block 32 the bolt 30 extends. The block 32 locates in a correspondingly shaped recess 34 in the top of the respective beam 28, to permit limited pivotal movement of the beams 28 relative to the bolts 24.

A clamping arrangement 36 is pivotally mounted to each of the side limbs of the beams 28, towards the lower end thereof. Each arrangement 36 includes a bar 38 which extends through a recess in the lower end of the respective side limb of the beam 28, and is pivotally mounted thereto, about a generally mid point of the bar 38. An engagement member 40 extends downwardly from each end of each bar 38 through an opening in the clamping assembly 20. A trapped ball bearing 41 is provided at the free end of each engagement member 40, and the ball bearing 41 may have one or more flattened faces engageable with the respective aerofoil 12. As can be seen in FIG. 2, a shorter engagement member 40 is provided on the left hand side of each bar 38, to correspond to the inclination of the top surface of the aerofoils 12.

A number of other adjustable support members are engageable with the guide vane 10. FIG. 4 shows two adjustable support members 42, 44. The upper support member 42 as shown in FIG. 4 extends forwards as shown in FIG. 2 out of the clamping assembly 20 to engage with a one of the plates 14. The lower support member 44 as shown extends rearwards and upwardly as shown in FIG. 2 to engage with the other plate 14. Each of the support member 42, 44 includes a cylindrical sleeve 46 from which an engagement bar 48 extends. The engagement bar 48 may again have a trapped ball bearing 50 at its free end. The engagement bar 48 is spring urged out of the sleeve 46 by a trapped spring 52. A locking screw 54 extends laterally into the sleeve 46 to engage with the bar 48 to hold same at a required position extending from the sleeve 46.

The support member 44 extends from a block 56 located generally midway along the support platform 18. A fixed support member 58 also extends from the block 56, and in this instance the member 58 extends in a forwards direction relative to FIG. 2. The support member 58 could be spring urged to reduce vibration. A fixed support member 60 also extends from the clamping assembly 20 in an opposite direction to the support member 42 to engage with the other plate 14.

As shown in FIG. 2 two further fixed support members 62, 64 are provided on the platform 18, and are located to each receive and support a substantially lowermost part of the respective aerofoil 12. A further adjustable support member 66 is provided extending upwardly and to the right as shown in FIG. 2 from the block 26, to be engageable with the underside of an upper part of the left hand aerofoil 12 as shown in FIG. 2.

A further adjustable support member 68 extends upwardly through the block 56 to locate beneath the right hand aerofoil 12 as shown in FIG. 2 to provide support therefor. A lock screw 72 for the support member 70 extends through the support platform 18 to the right hand side thereof as shown in FIG. 2. A pair of spaced adjustable support members 74 are provided extending through a block 76 at the right hand end of the support platform 18 as shown in FIG. 2, which block 76 mounts a pair of spaced webs 78 which mount a pin 80 to provide the axis 22.

To use the system 16, the bolt 24 will be undone and the clamping assembly 20 pivoted upwardly. The nozzle guide vane 10 can then be located in position, with the aerofoil 12 resting inter alia on the fixed support member 58, 62, 64. A number of the adjustable support members such as 42, 52, 66, 68 and 74 can be adjusted as required.

The clamping assembly 20 is then pivoted back onto the support platform 18, and the bolt 24 is tightened. The clamping assembly 20 can then be brought into play by tightening of the bolts 30, which bolts 30 can be tightened to the same torque setting. As the bolts 30 are tightened, dependent on the precise positioning and shape of the nozzle guide vane 10, the beams 28 may pivot slightly relative to the alignment of the bolt 30. Also the bars 38 may pivot so that substantially equal clamping forces are applied by the respective engagement members 40.

The nozzle guide vane 10 will then be securely held, and appropriate grinding or other operations can be carried out as required. It has generally been found that all grinding operations can be performed on the nozzle guide vane 10 without removal from the system 16. The clamping assembly with the pivoted beams and bars means that differences due to manufacturing tolerances can generally be automatically compensated for by the engagement members. The system therefore readily permits a nozzle guide vane to be located thereon, whilst compensating for manufacturing differences in the vane.

Various modifications may be made without departing from the scope of the invention. For instance a different number and/or arrangement of engagement and support members may be provided as required. The engagement members may take a different form. The engagement members may have heads with an enlarged cross sectional area to spread the clamping load on an item. Whilst the above-described example relates to clamping of guide vanes, such systems could be used with other components or articles.

What is claimed is:

1. A clamping system, the system including a support platform upon which an item to be clamped can locate, a clamping assembly selectively movable to a closed position relative to the support platform, with at least two clamping arrangements being provided on the clamping assembly, each clamping arrangement including a pair of engagement members mounted on a pivotally mounted arm either side of the pivotal mounting of said arm, such that the engagement members are engageable when the assembly is in a closed position with item on the support platform to be clamped, and the arm can pivot as required relative to the item, to accommodate differences in shape in the item, whilst providing a substantially equal clamping force by both engagement members, wherein at least a pair of clamping arrangements are pivotally mounted to a beam member either side of a location where the beam member is pivotally mounted to the clamping assembly.

2. A clamping system according to claim 1, in which the beam member is threadably mounted by a bolt member on the clamping assembly, such that a clamping force can be applied thereto.

3. A clamping system according to claim 2, in which the bolt member is engageable with the beam member through profiled contact surfaces which permit pivotal movement of the beam member.

4. A clamping system according to claim 3, in which the contact surfaces are substantially hemispherical.

5. A clamping system according to claim 1, in which the engagement members include heads with an enlarged cross sectional area relative to the remainder of the engagement member, so as to spread the clamping load on an item.

6. A clamping system according to claim 1, in which the engagement members have heads which include trapped movable members.

7. A clamping system according to claim 1, in which the clamping assembly is pivotally mounted relative to the support platform.

8. A clamping system according to claim 7, in which locking means is provided for retaining the clamping assembly in a closed position.

9. A clamping system according to claim 1, in which one or more adjustable supports are provided engageable with an item in use, the adjustable supports being provided on the clamping assembly and/or the support platform.

10. A clamping system for a nozzle guide vane of a gas turbine engine, the system being according to claim 1.

11. A clamping system according to claim 10, in which the system is arranged such that the engagement members are engageable with the aerofoil of a nozzle guide vane.

12. A clamping system according to claim 10, in which the system is arranged such that the clamping arrangement on one side of a beam member engage with a first aerofoil of a nozzle guide vane, and the clamping arrangement on the other side of the beam member engage with a second aerofoil of the nozzle guide vane.

\* \* \* \* \*